(12) United States Patent
Kelly et al.

(10) Patent No.: US 8,576,580 B2
(45) Date of Patent: Nov. 5, 2013

(54) HORIZONTAL CABLE MANAGER

(75) Inventors: Thomas C. Kelly, Lockport, IL (US); Russell A. Knaack, Homer Glen, IL (US)

(73) Assignee: Panduit Corp., Tinley Park, IL (US)

( * ) Notice: Subject to any disclaimer, the term of this patent is extended or adjusted under 35 U.S.C. 154(b) by 84 days.

(21) Appl. No.: 13/197,062

(22) Filed: Aug. 3, 2011

(65) Prior Publication Data
US 2011/0286198 A1 Nov. 24, 2011

Related U.S. Application Data

(63) Continuation of application No. 11/956,388, filed on Dec. 14, 2007, now Pat. No. 8,014,171.

(60) Provisional application No. 60/870,885, filed on Dec. 20, 2006.

(51) Int. Cl.
*H02B 1/20* (2006.01)

(52) U.S. Cl.
USPC .......................................... 361/826; 361/825

(58) Field of Classification Search
USPC ................................................. 361/825–826
See application file for complete search history.

(56) References Cited

U.S. PATENT DOCUMENTS

| | | | |
|---|---|---|---|
| 5,096,439 A | 3/1992 | Arnett | |
| 6,019,321 A | 2/2000 | Carlson, Jr. et al. | |
| 6,489,565 B1 | 12/2002 | Krietzman et al. | |
| 6,501,899 B1 * | 12/2002 | Marrs et al. | 385/135 |
| 6,766,093 B2 | 7/2004 | McGrath et al. | |
| 6,884,942 B2 | 4/2005 | McGrath et al. | |
| 7,000,784 B2 | 2/2006 | Canty et al. | |
| 7,178,679 B2 * | 2/2007 | Canty et al. | 211/26 |
| 7,378,046 B2 | 5/2008 | Canty et al. | |
| 2004/0051426 A1 | 3/2004 | Krampotich | |

FOREIGN PATENT DOCUMENTS

| | | |
|---|---|---|
| EP | 1455542 A2 | 8/2004 |
| WO | 0174091 A2 | 10/2001 |

* cited by examiner

*Primary Examiner* — Hung S Bui
(74) *Attorney, Agent, or Firm* — Christopher S. Clancy; James H. Williams

(57) ABSTRACT

A cable manager provides horizontal cable management of adjacent patch panels or network equipment on network distribution racks. The cable manager includes a central section and a front cable routing section and is mountable on a network rack. The front cable routing section extends from the front side of the central section and includes a first plurality of spaced fingers. The cable manager can also include a rear cable routing section that includes a second plurality of spaced fingers. The first plurality of spaced fingers and the second plurality of spaced fingers may be sloped to provide hand access. One or more passthrough openings can be provided in the central section to allow routing of cabling from the front section to the rear section. An air dam may be inserted into the passthrough openings to control the flow of cool inlet air. Either or both of the front and rear sections can include a removable cover.

20 Claims, 18 Drawing Sheets

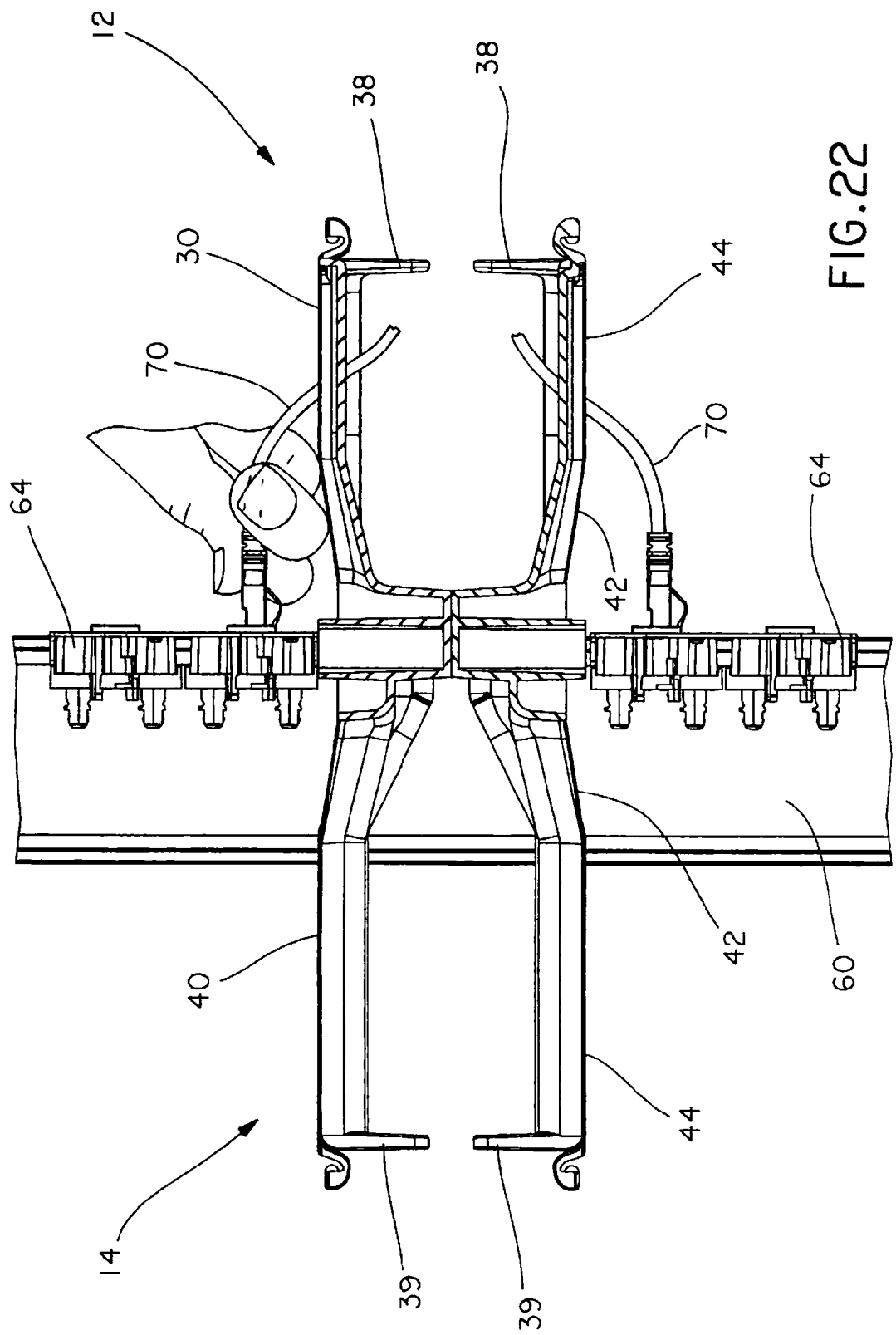

HORIZONTAL CABLE MANAGER

CROSS-REFERENCE TO RELATED APPLICATION

This application is a continuation of U.S. patent application Ser. No. 11/956,388, filed on Dec. 14, 2007, which claims priority to U.S. Provisional Patent Application No. 60/870,885, filed on Dec. 20, 2006, each of which is incorporated by reference in its entirety.

FIELD OF THE INVENTION

The present invention relates generally to cable management devices for patch panel or network equipment racks and, more particularly, relates to a cable manager for use with adjacent patch panels or network equipment on distribution racks or within cabinets, with an improved finger and thermal design.

BACKGROUND OF THE INVENTION

Cabling, such as UTP, ScTP, coax, and fiber optic cabling, is being increasingly used in the telecommunications industry to provide data, voice, video, or audio information. Patch panel or network equipment enclosure and rack systems are well-known in the industry and provided to manage and organize such cables to or from equipment or cross-connect systems. These systems usually include a standard EIA 19", 23", or other distribution frame rack on which one or more patch panels, network equipment and/or fiber optic enclosures are mounted. Enclosures within the rack serve various functions, including operation as slack trays, splice trays, cable organizers and patch panels. These racks also serve as inter-connect or cross-connect enclosures when interfacing with equipment, or may serve as a telecommunications closet, allowing the cables to be terminated, spliced, patched or stored at places along their length.

The rack usually is formed of a frame having mounting apertures located along vertical legs or walls of the rack. Patching equipment, such as a patch panel, is mounted on the rack so as to define generally a patching side where patch cords coming from an active device or another patch panel can be cross-connected and interconnected, and a distribution side where cables from network equipment or a work station area are terminated. Generally, some form of cable management is also provided on both sides of the rack to support and route the cables. Additionally, a passthrough opening may allow cables to be routed from one side of the rack to the other.

Typically, the cabling is manually connected to the patch panel, both on the patching side and the distribution side. Depending on the number of cables being connected, an installer may have difficulty accessing the panel with either his hands or tools. A poor connection at the patch panel may result in communication problems or other problems depending on the type of equipment connected to the cables.

SUMMARY OF THE INVENTION

A cable manager mountable to a network rack is described. In one example, the cable manager includes a central section having a longitudinal width sized to fit within the network rack. The central section has a predefined height, a front side, a rear side, and rack mounting holes provided on opposite longitudinal ends of the central section.

The cable manager also includes a front cable routing section extending from the front side of the central section. The front cable routing section includes a first plurality of spaced fingers extending transversely from the front side of the central section. Each of the first plurality of spaced fingers has a first proximate end at the central section and a first distal end opposite the central section. The first proximate end is located closer relative to a center of the front cable routing section than the first distal end. For example, the first distal end may slope outwardly from the first proximate end.

Each of the fingers in the first plurality of spaced fingers may have an arcuate surface that provides bend radius control. Additionally, the first plurality of spaced fingers may be arranged in multiple spaced rows.

The front cable routing section may include a first half and a second half that are connected together to form the front cable routing section. The first and second halves may be substantially identical and one of the halves may be rotated substantially 180° with respect to the other half before forming the front cable routing section. Additionally or alternatively, the first and second halves may each have at least one of a first dimension and a second dimension, and the front cable routing section is at least one of a first size, a second size and a third size.

The cable manager may also include a rear cable routing section extending from the rear side of the central section. The rear cable routing section includes a second plurality of spaced fingers extending transversely from the rear side of the central section. Each of the second plurality of spaced fingers has a second proximate end at the central section and a second distal end opposite the central section. The second proximate end is located closer relative to a center of the rear cable routing section than the second distal end. For example, the second distal end may slope outwardly from the second proximate end.

The spacing between the second plurality of spaced fingers may accommodate a punch down process. Additionally, the second plurality of spaced fingers may be arranged in multiple spaced rows. The length of each of the fingers in the second plurality of spaced fingers may be designed to provide a substantially equal cable capacity to the front side of the central section.

The rear cable routing section may include a first half and a second half that are connected together to form the rear cable routing section. The first and second halves may be substantially identical and one of the halves may be rotated substantially 180° with respect to the other half before forming the rear cable routing section. Additionally or alternatively, the first and second halves may each have at least one of a first dimension and a second dimension, and the rear cable routing section is at least one of a first size, a second size and a third size.

The central section may include at least one passthrough opening that provides access between the front cable routing section and the rear cable routing section. If so, the cable manager may also include an air blocking device that fits within the passthrough opening and prevents air flow from passing between the front cable routing section and the rear cable routing section when inserted. For example, the air blocking device may snap into the passthrough opening.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 22 is a side view of a cable manager installed in a network rack showing hand access to a patch panel.

DETAILED DESCRIPTION

A cable manager 10 according to an exemplary embodiment of the present invention is generally shown in FIGS. 1-22 and is useful in providing horizontal cable management in a network rack 5.

Figure 1:
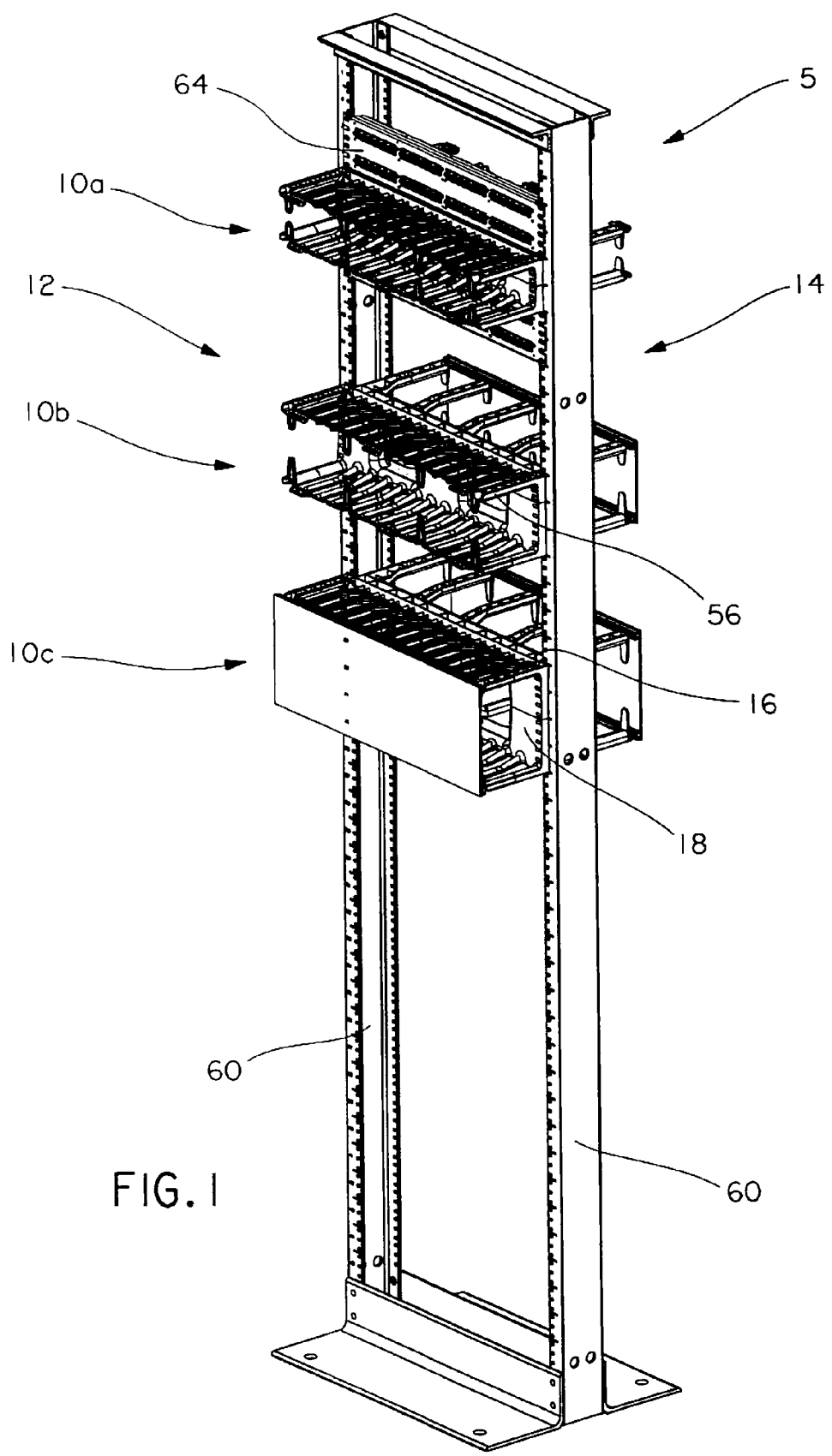
FIG. 1 shows three cable managers installed in a network rack, according to an example.

FIG. 1 depicts three cable managers 10a, 10b, 10c (generally referred to as cable manager 10) mounted on the network rack 5; however, it is understood that more or less than three cable managers 10 may be mounted on the network rack 5. A suitable rack is a conventional 19" or 23" Electronic Industries Association (EIA) network rack that has spaced vertical rails or legs that allow mounting of various numbers of rack elements thereon. However, the invention is equally applicable to other known or subsequently developed racks. Moreover, the network rack 5 need not be an open frame structure as in the above EIA racks, but may include mounting cabinets or enclosures having mounting features and walls defining openings that can receive and fix rack elements, such as the cable manager 10 or a patch panel 64.

Figure 2:
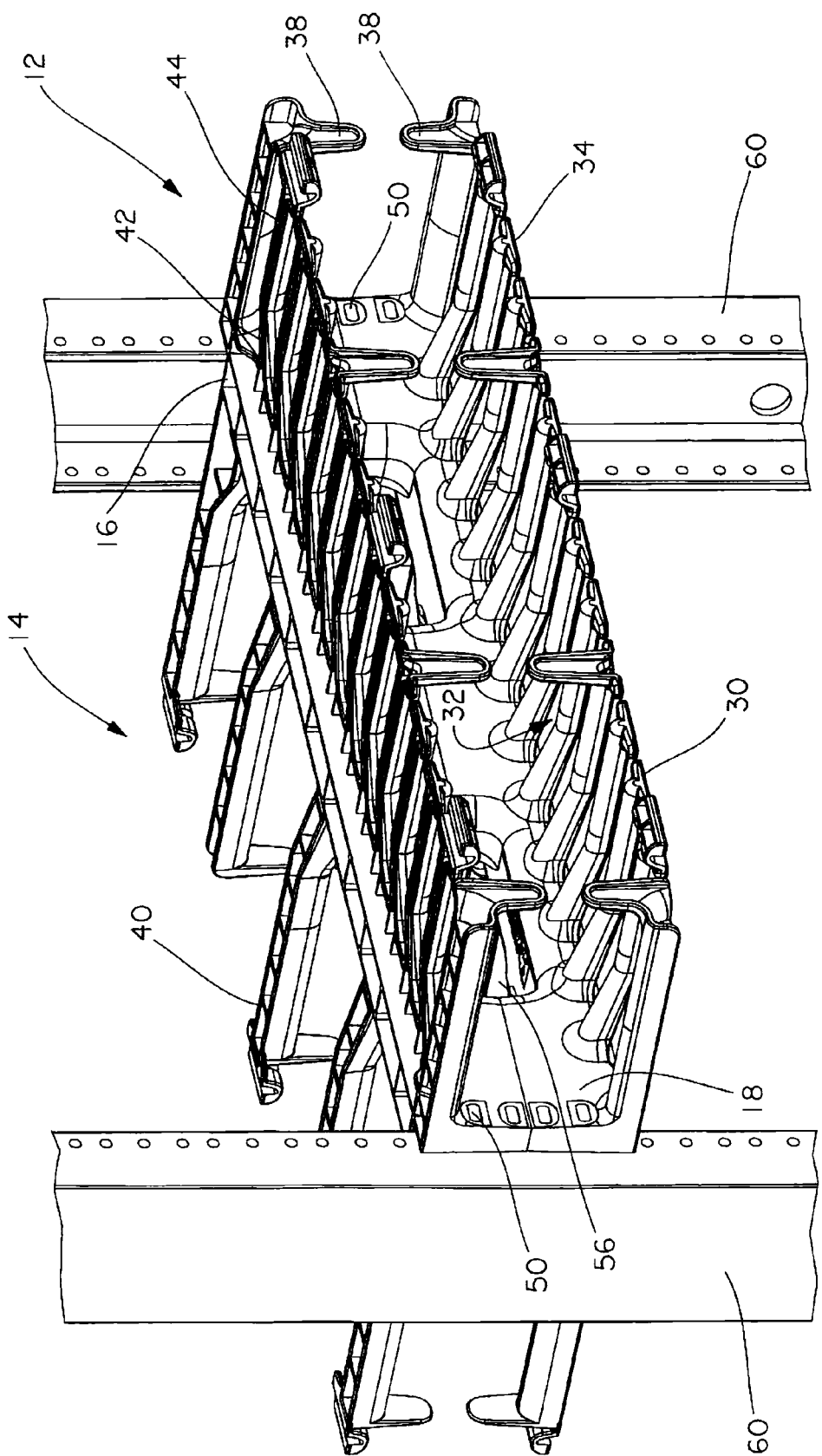
FIG. 2 is a front perspective view of a cable manager, according to an example.
Figure 3:
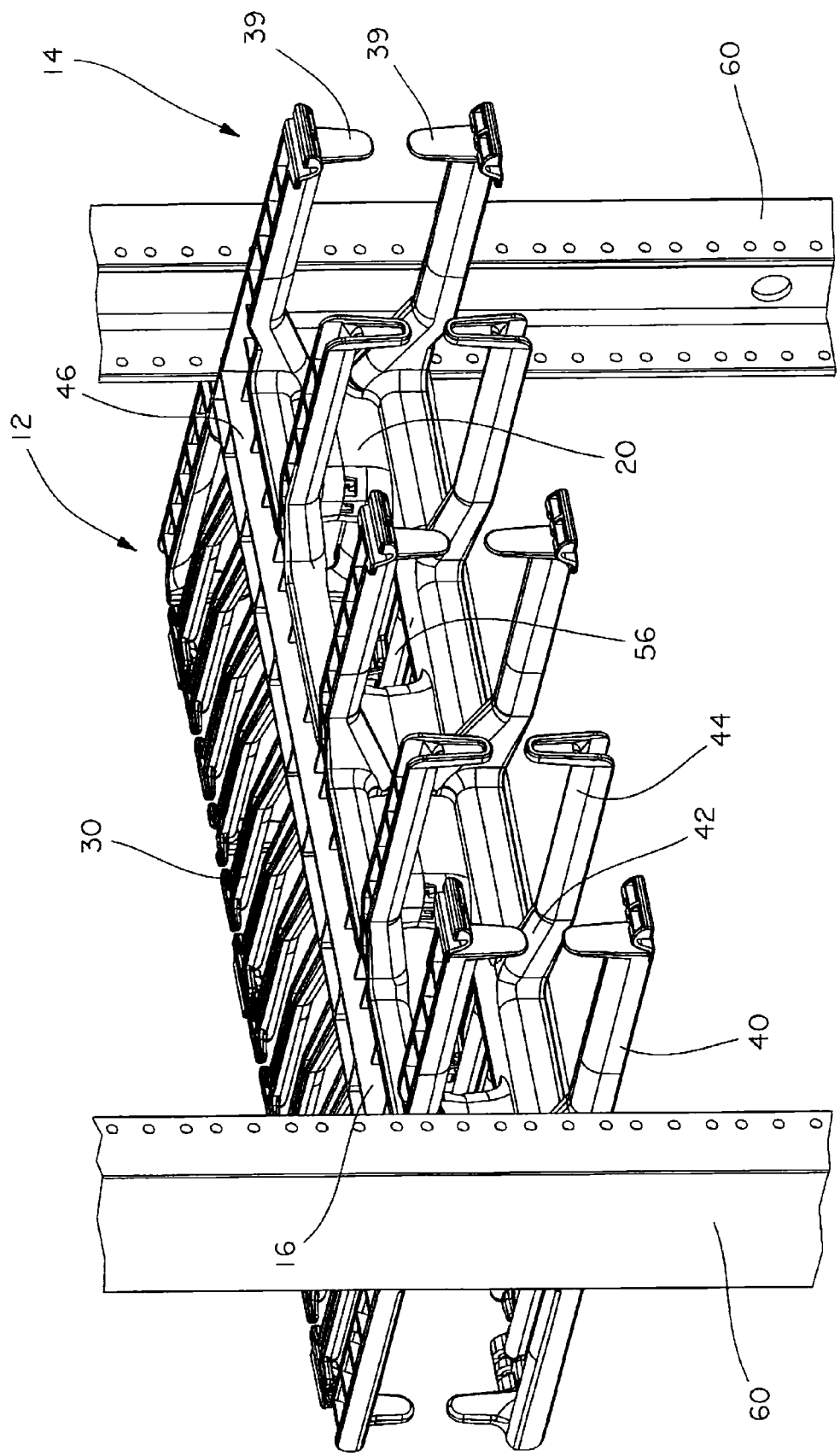
FIG. 3 is a rear perspective view of a cable manager, according to an example.

As can be seen from FIGS. 1, 2, and 3, the cable manager 10 generally includes a front cable routing section 12, a rear cable routing section 14 and a central section 16, which may have passthrough capabilities. The front and rear cable routing sections 12, 14 generally include a pair of back-to-back channels each formed by a base section 18, 20 and a plurality of upstanding fingers 30, 40 disposed longitudinally along at least one and preferably two opposing sides (front and rear) of the respective base sections 18, 20. However, the cable manager 10 may include only one of the front cable routing section 12 and the rear cable routing section 14.

Central section 16 has a suitable height, a longitudinal width sized to fit within a desired network rack, and a depth which approximates the depth dimension of rack legs 60 or a mounting cabinet (not shown) to which the cable manager 10 is mounted. In the case of a 19" network rack, the width would be approximately 19" when mounted horizontally on the rack and the height would be a multiple of 1.75", which is a single rack unit. However, these are exemplary and may change depending on the size and type of rack used.

Each longitudinal end of the central section 16 contains a plurality of mounting holes 50 that mount the cable manager 10 to a frame structure, such as the legs 60 of a standard rack system or to walls of a mounting cabinet (not shown). The legs 60 (or other equivalent mounting frame structure) have various apertures that allow mounting of the cable manager 10 to the rack by a suitable mounting element, such as a bolt, that extends through the mounting holes 50 and rack apertures aligned therewith. The base sections 18, 20 are integrally connected by a central wall and a plurality of strengthening walls 22 to comprise the central section 16.

The central section 16 of the cable manager is preferably a passthrough section that includes one or more passthrough openings 56. The passthrough openings 56 allow installers the ability to route cables from one side of the rack 5 to the other (i.e., from the patching side to the distribution side and vice versa). The passthrough openings 56 preferably are formed with curved sidewalls that provide bend radius control to cables routed through the passthrough openings 56.

The front cable routing side of the cable manager (front section 12) preferably forms the patching side where active equipment is interconnected or patch cords on the patch panel 64 are cross-connected. As shown in FIG. 2, patching side fingers 30 extend from base section 18 in the form of two parallel and spaced rows that define a cable channel. The fingers 30 are separated from adjacent fingers 30 to provide a space 32 for routing cables from within the cable channel to the equipment either above or below on the rack 5. The fingers 30 preferably extend outwardly beyond the frame legs 60 as shown.

Each of the plurality of patching side fingers 30 are formed having an inwardly directed arcuate surface at least on a distal portion of the finger 30. The arcuate surfaces of the fingers 30 have a predefined minimum radius that provides a bend radius control surface for wires and cables. The minimum bend radius can vary depending on the types of wires and cables used. An exemplary radius may be 1" or greater for many applications. However, the minimum bend radius should be selected to correspond to desired criteria of cable(s) to be managed by the cable manager 10.

The fingers 30 are also provided with a pair of ears 34 formed near the distal end with each ear extending towards an opposing ear formed on an adjacent finger 30. The ears 34 preferably have a generally triangular configuration that provide angled surfaces, which assist in the insertion and removal of cables from in between the fingers 30.

As the formation of the fingers 30 with an arcuate cross-section has been found to result in a relatively stiff structure, each finger 30 on the patching side may also include a slit (not shown) medially disposed along the arcuate surface of the finger 30. The slit may be formed to extend from the distal end towards the base 18 approximately one-half the length of finger 30. The slit may provide additional flexibility to the fingers 30 during routing of cables.

Typically, the largest cable load is exerted on the end fingers. To accommodate this additional cable load, the fingers 30 at each end of the front cable routing section 12 may be designed to be more robust and support a larger load than the other fingers 30. For example, the end fingers 30 may include support structures similar to the strengthening walls 22 in the central section 16.

The fingers 30 slope outwardly from the base section 18 such that the end of the finger 30 at the base section 18 is located closer relative to the center of the front cable routing section 12 than the distal end of the finger 30. For example, the incline of the slope may be approximately 0.325 inches. By providing slope to the finger 30, the installer has greater access to adjacent patch panels for their hands and/or tools. This hand access is more clearly shown in FIG. 22.

As seen in FIGS. 2 and 22, each finger 30 has a sloped section 42 and a level section 44. The lengths of the sloped section 42 and the level section 44 may be different (as shown) or approximately the same length. Alternatively, each of the fingers 30 may only have a sloped section 42 (i.e., the length of the level section 44 is zero).

The rear side of the cable manager (rear section 14) preferably forms the distribution side where cables from network equipment or a work station area can be terminated. As shown in FIG. 3, distribution side fingers 40 extend from base section 20 in the form of two parallel and spaced rows that define a cable channel. The fingers 40 preferably extend outwardly beyond the frame legs 60 as shown.

Figure 9:
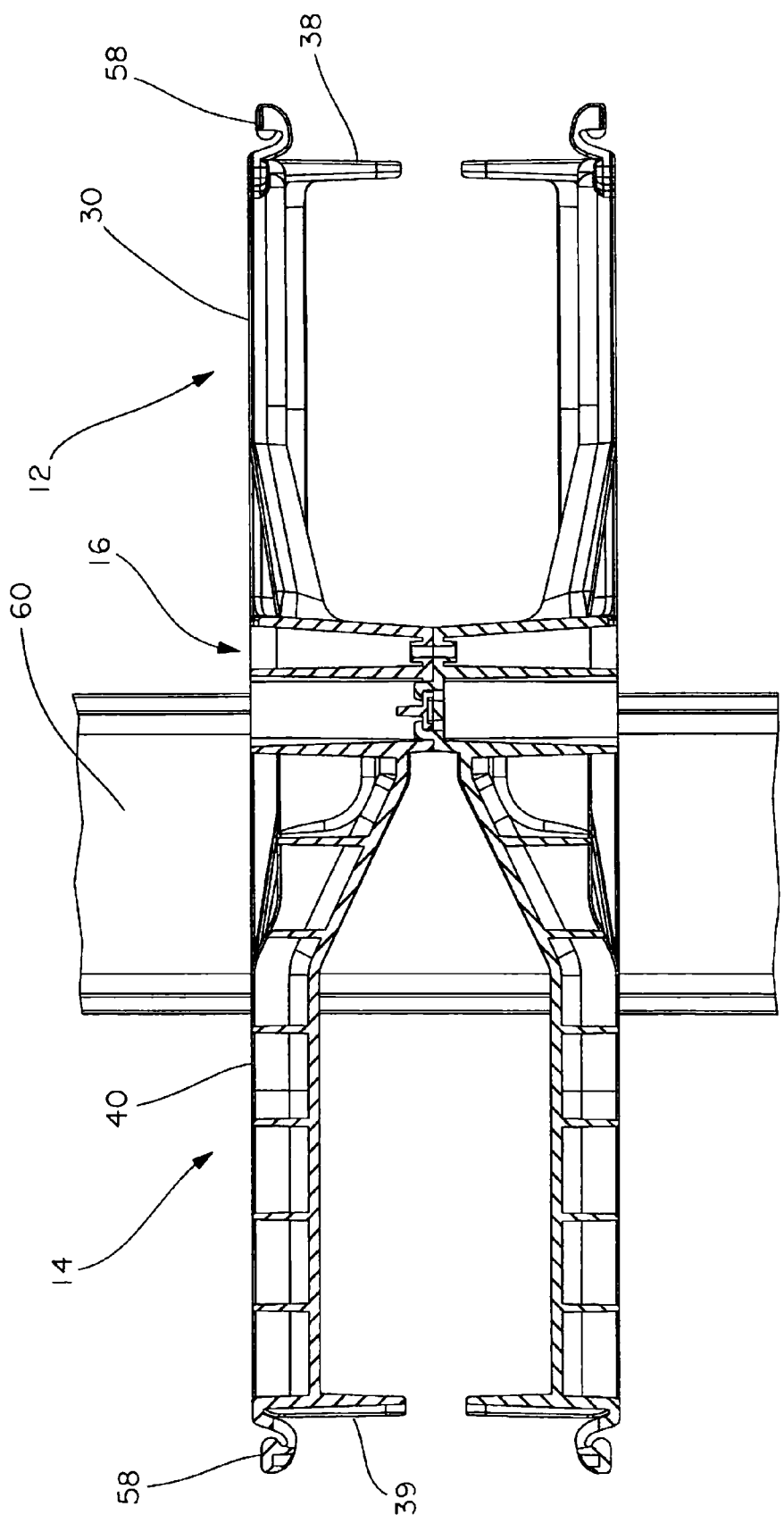
FIG. 9 is a side view of a cable manager showing that a front cable routing section and a rear cable routing section provide an equal cable capacity.

As seen more clearly in FIGS. 9 and 22, the length of each of the distribution side fingers 40 may be longer than the length of the patching side fingers 30. The length of the distribution side fingers 40 may be designed to provide an equal cable capacity to the front side when the width of the rack (typically, three inches) is subtracted. Thus, the distribution side fingers 40 may be longer than the patching side fingers 30 so as to include the width of the rack legs 60.

Additionally, the number of patching side fingers 30 may be different than the number of distribution side fingers 40. For example, FIG. 2 depicts fourteen patching side fingers 30, while FIG. 3 depicts five distribution side fingers 40. The number of fingers may depend on the design of the patch panel 64 and the type of cable 70 managed by the cable manager 10. For example, the fourteen patching side fingers 30 are designed for optimal spacing and even distribution of cable, such as two Cat6A or four Cat5E cables per finger, for any style patch panel 64, while the five distribution side fingers 40 accommodates the process of connecting cables 70 to the distribution side of the patch panel, sometimes referred to as the "punch down" process.

Each of the plurality of distribution side fingers 40 are formed having an arcuate surface at least on a distal portion of the fingers 40. Additionally, the fingers 40 at each end of the rear cable routing section 14 may be designed to be more robust and support a larger load than the other fingers 40. For example, the end fingers 40 may include support structures similar to the strengthening walls 22 in the central section 16.

On the distribution side, the installer often has need for greater access to the adjacent patch panels for their hands and other tools. The distribution side may include a stepped down portion 46 that provides additional room to accommodate a tool and/or hand of an installer. Additionally or alternatively, the fingers 40 may also slope outwardly from the base section 20 such that the end of the finger 40 at the base section 20 is located closer relative to the center of the rear cable routing section 14 than the distal end of the finger 40. For example, the incline of the slope may be approximately 0.325 inches.

As seen in FIG. 22, each finger 40 has a sloped section 42 and a level section 44. The lengths of the sloped section 42 and the level section 44 may be different (as shown) or approximately the same length. Alternatively, each of the fingers 40 may only have a sloped section 42 (i.e., the length of the level section 44 is zero). By providing slope to the finger 40, the installer has greater access to adjacent patch panels for their hands and/or other tools.

Selected fingers from both sets of fingers 30, 40 also include respective retaining flanges 38, 39 formed on the distal ends to help retain routed cables 70 when a cover is not present.

Figure 4:
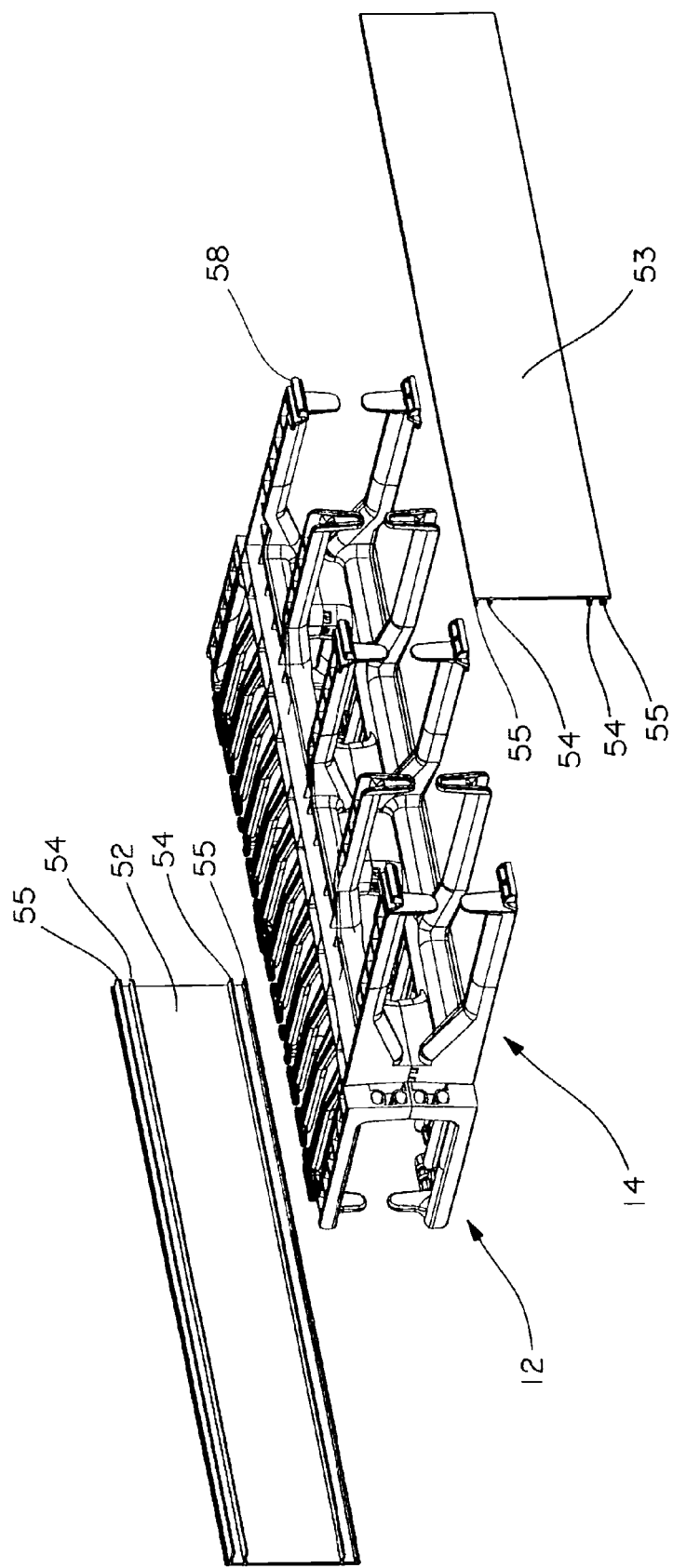
FIG. 4 is a rear perspective view of a cable manager shown with covers, according to an example.

As seen in FIG. 4, a front cover 52 may be used to cover the front section 12, while a rear cover 53 may be used to cover the rear section 14. Preferably, the covers 52, 53 are extruded plastic covers. The front and rear covers 52, 53 may be connectable to the front and rear sections 12, 14 in a manner such that the cover can be rotated up or down. That is, the covers 52, 53 can be opened from either side. The covers 52, 53 may also be completely removable.

In one example, the covers 52, 53 may snap onto the front and rear sections 12, 14. Each of the covers 52, 53 may have two pairs of inner 54 and outer 55 legs. The inner and outer legs 54, 55 may snap onto a hinge knuckle 58, which can be more easily seen in FIG. 5. When closed, the cover 52, 53 snaps onto the hinge knuckle 58 and the inner and outer legs 54, 55 are spread outward to provide retention force. When the cover 52, 53 is opened, the outer leg 55 of the cover 52, 53 is retained by the hinged knuckle 58. As described, the knuckle 58 secures the cover 52, 53 in the closed position and acts as a hinge when the cover 52, 53 is open.

Figure 5:
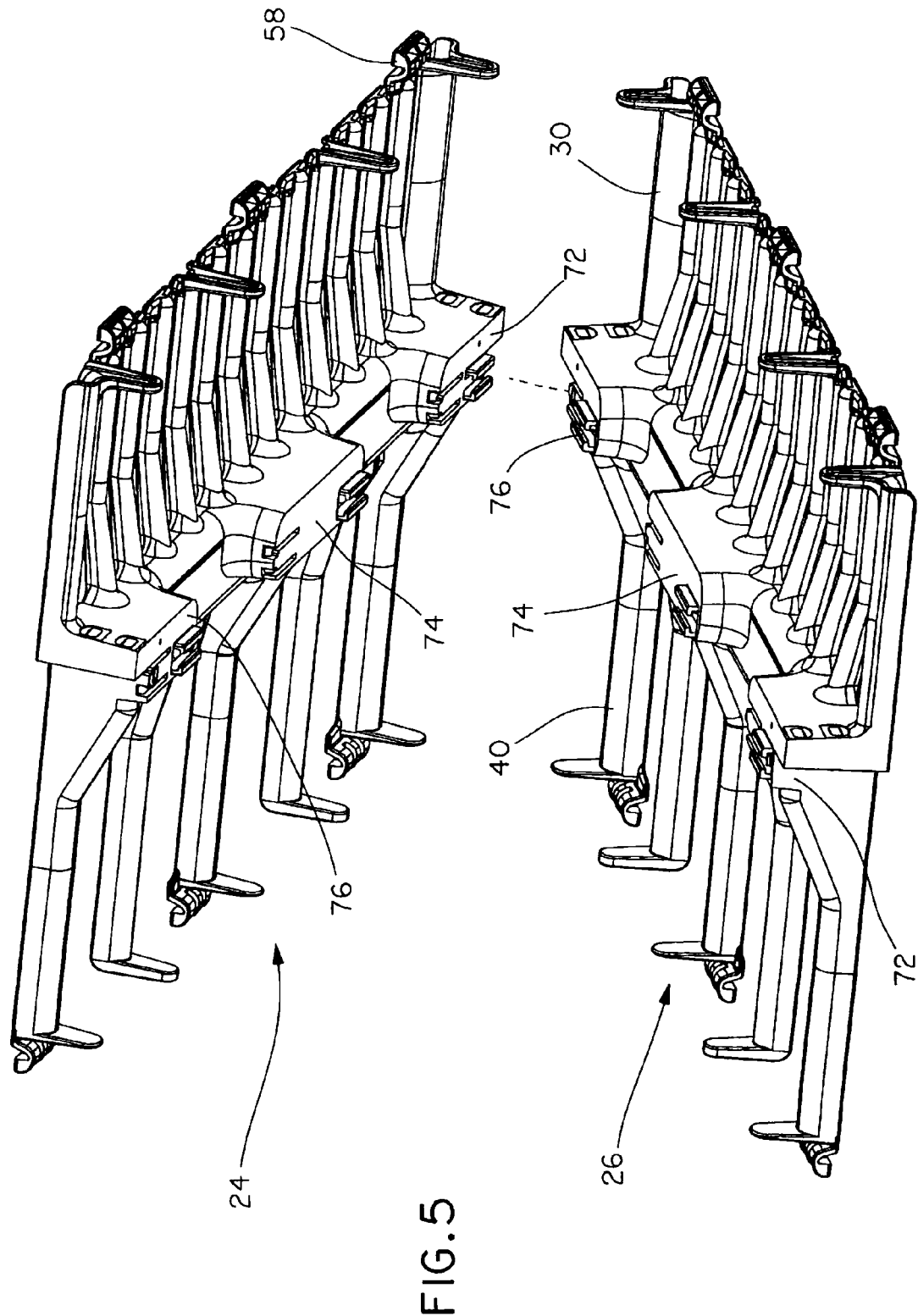
FIG. 5 is an exploded view of a cable manager showing 180° snap construction, according to an example.

As depicted in FIGS. 4 and 5, each row of fingers 30, 40 includes three hinge knuckles 58, one towards each end of the rows and one in the middle of the row. However, a different number and arrangement of hinged knuckles 58 may be used.

In another example, the covers 52, 53 may be hingedly connected to cable manager 10 by a plurality of spaced apart pairs of hinge brackets having apertures. For example, the covers 52, 53 may be a hinged cover as described in U.S. Pat. No. 6,766,093, which is assigned to the same assignee as the subject application. U.S. Pat. No. 6,766,093 is hereby incorporated by reference in its entirety.

The cable manager 10 is preferably formed by an injection molding process, in which two halves are molded and then snap fit together to form a single cable manager device that is mountable on and provides cable management to both a patching side and a distribution side of a network rack 5. FIG.

5 depicts two halves, a first half 24 and a second half 26. The first and second halves 24, 26 may be substantially identical and rotated 180° to each other prior to snapping the halves 24, 26 together. Alternatively, the first and second halves 24, 26 may have different base portion widths as described with reference to FIGS. 10 and 11.

As seen in FIG. 5, each half 24, 26 has three locking mechanisms 72, 74, 76. The center locking mechanism 74 is designed to mate with another center locking mechanism 74 that is rotated 180°. The first end locking mechanism 72 is designed to mate with the second end locking mechanism 76. Thus, when the second half 26 is rotated 180° with respect to the first half 24, the first end locking mechanism 72 on the first half 24 mates with the second end locking mechanism 76 on the second half 26, the center locking mechanisms 74 on the first and second halves 24, 26 mate with each other, and the second end locking mechanism 76 on the first half 24 mates with the first end locking mechanism 72 on the second half 26.

Figure 6:
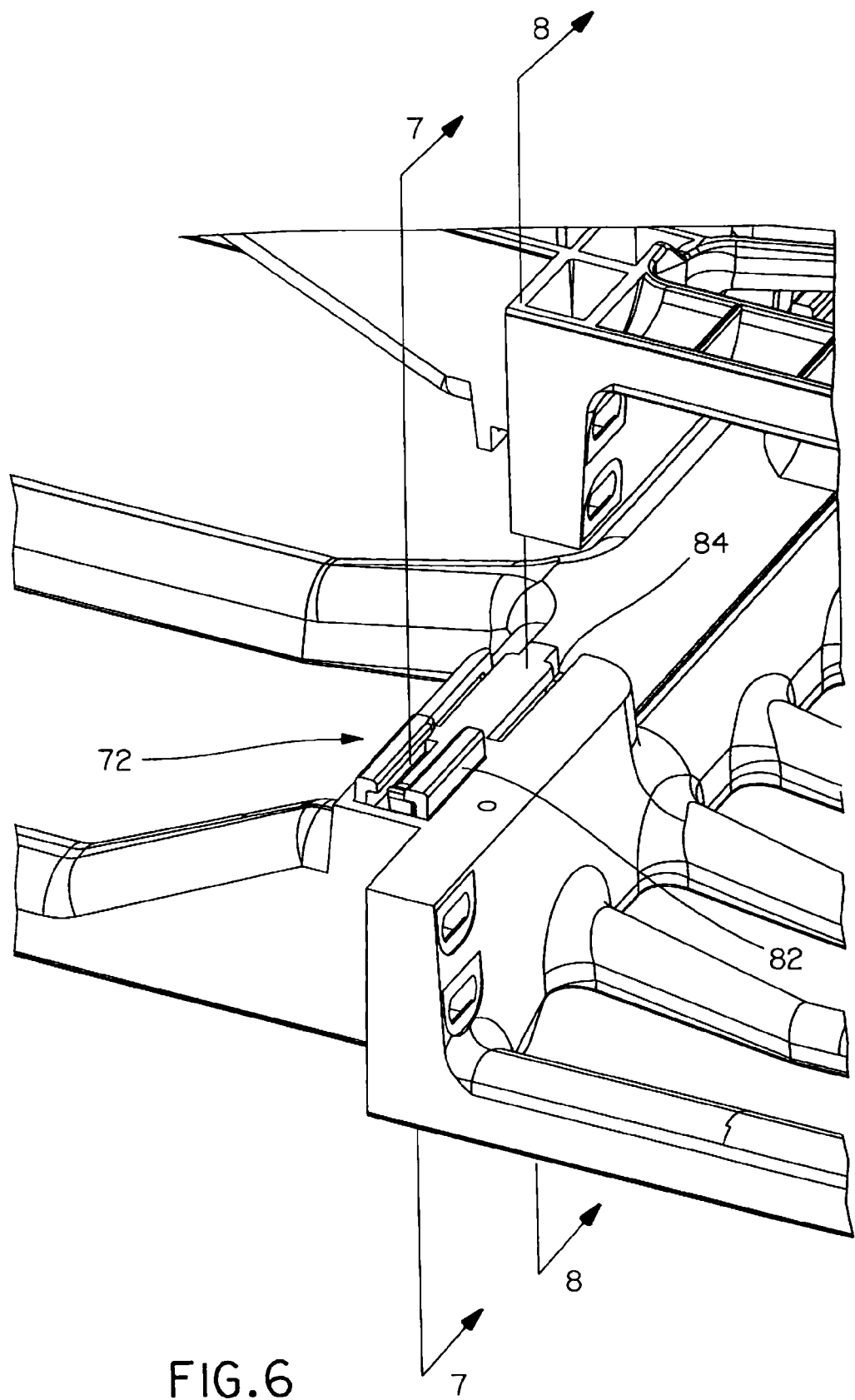
FIG. 6 is a partial view of the cable manager of FIG. 5 showing a locking mechanism, according to an example.
Figure 8:
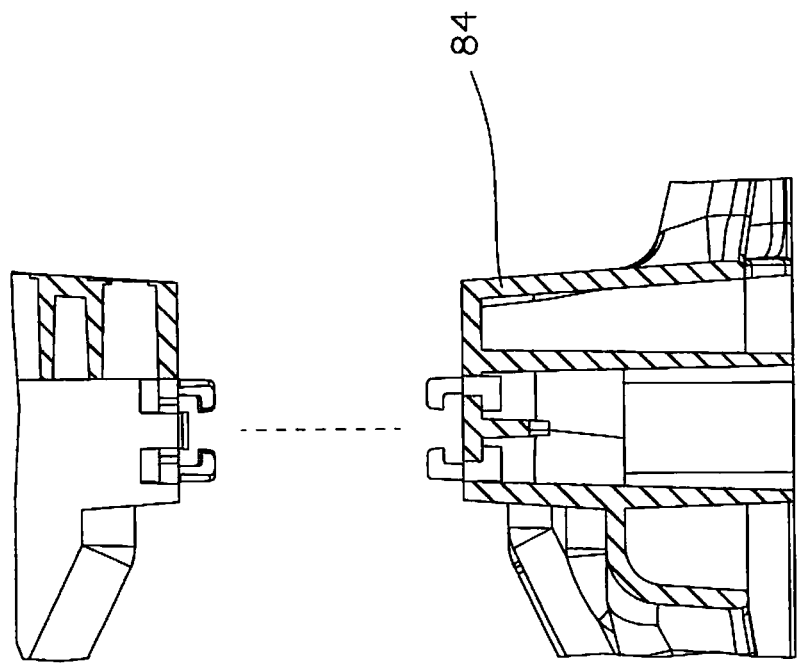
FIG. 8 is a partial view of the cable manager of FIG. 6 showing mating between a first half and a second half of the cable manager, according to another example.
Figure 7:
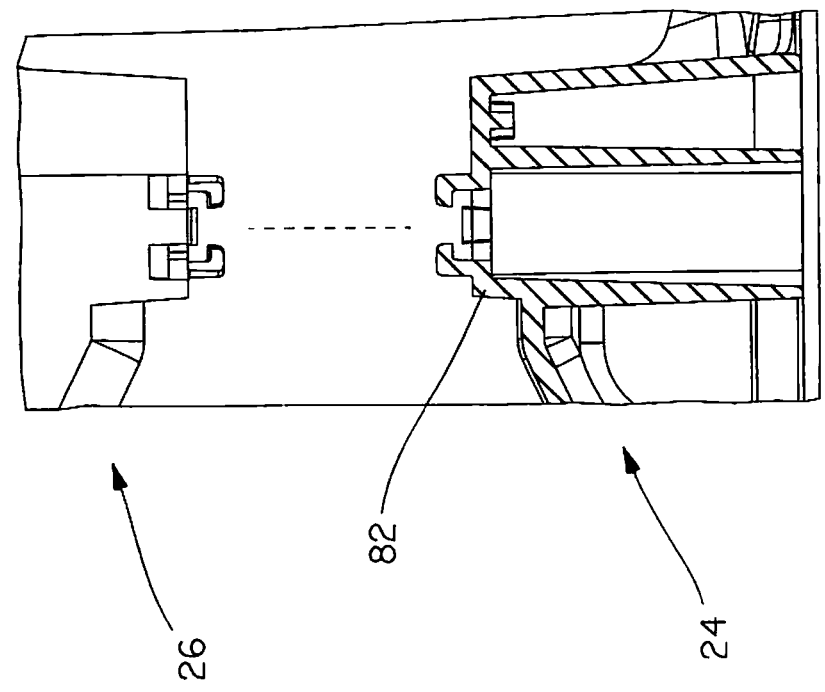
FIG. 7 is a partial view of the cable manager of FIG. 6 showing mating between a first half and a second half of the cable manager, according to an example.

FIGS. 6-8 show the locking mechanisms in more detail. FIG. 6 shows a detailed view of the first end locking mechanism 72. The center locking mechanism 74 and the second end locking mechanism 76 are similar to the first locking mechanism 72. Each locking mechanism 72, 74, 76 includes a male connector 82 and a female connector 84. FIGS. 7-8 show a cross-sectional view of the male connector 82 and the female connector 84 as the second half 26 is about to be connected to the first half 24. The inner locks of the male and female connectors 82, 84 provide a positive latching mechanism.

Figure 10:
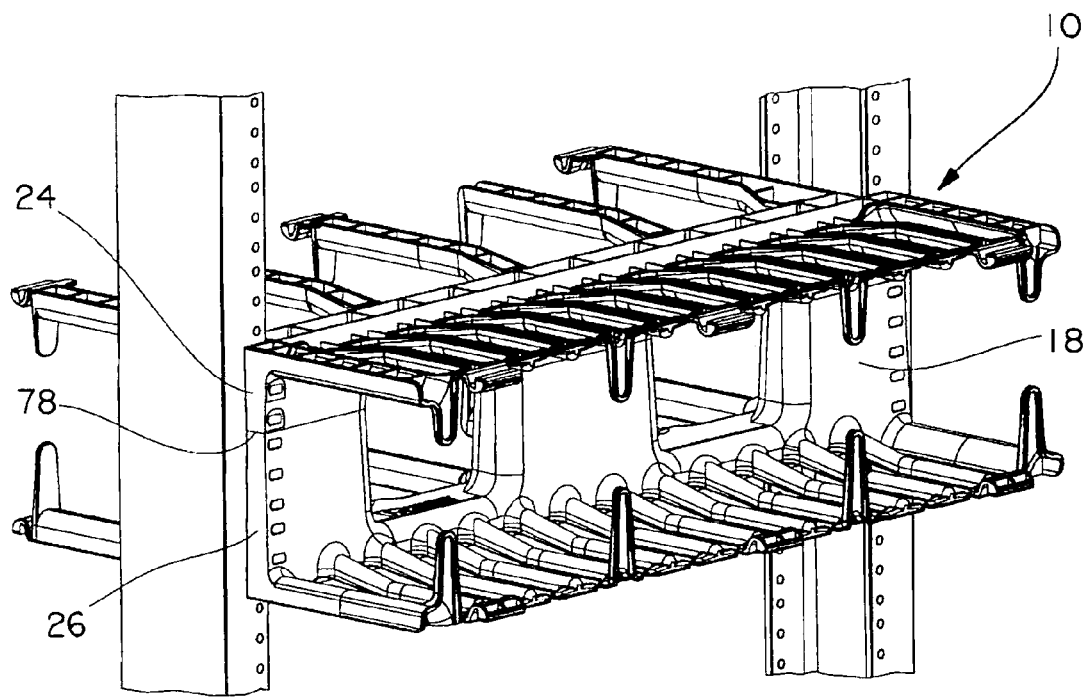
FIG. 10 is a front perspective view of a cable manager constructed with different sized halves, according to an example.
Figure 11:
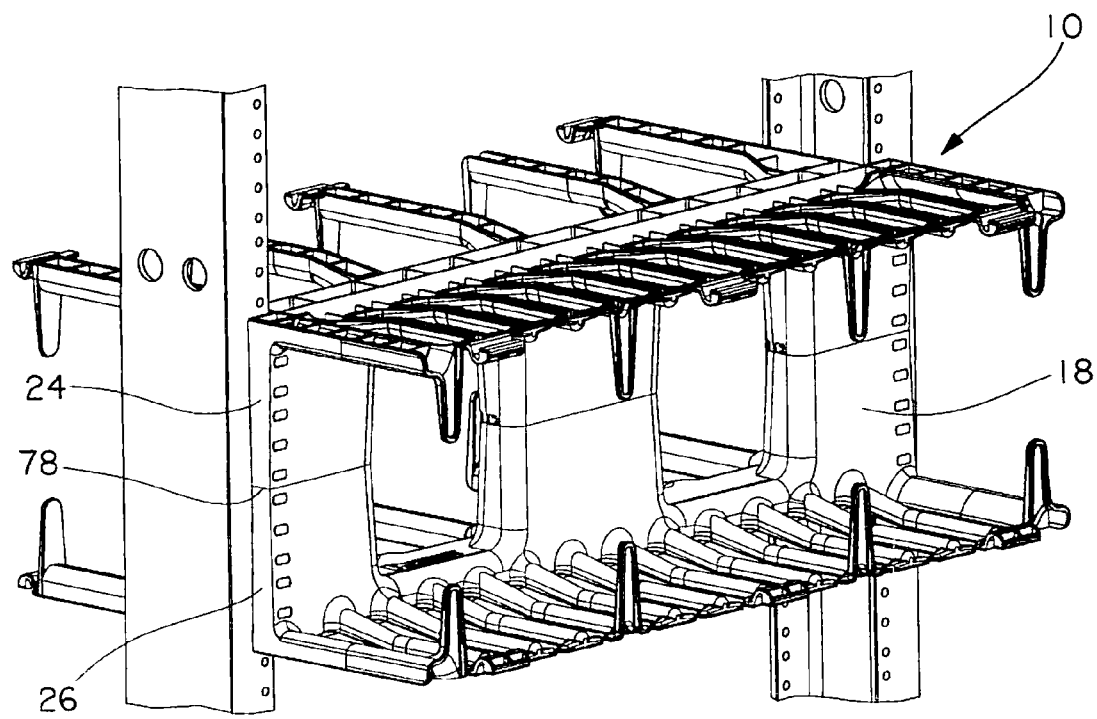
FIG. 11 is a front perspective view of a cable manager constructed with same sized halves, according to an example.

As seen in FIGS. 10 and 11, the front and rear base sections 18, 20 may be formed partially from the first half 24 and partially from the second half 26. An assembly line 78 demarks where the first and second halves 24, 26 are joined together. The portion of the first half 24 forming the base section 18, 20 may have the same or a different width than that of the portion of the second half 26 forming the base section 18, 20.

FIG. 10 shows a cable manager 10 formed with a first half 24 having a base portion that is smaller than the base portion of the second half 26. FIG. 11 shows a cable manager 10 formed with a first half 24 having a base portion approximately the same width as the width of the base portion of the second half 26. Thus, with this design, three different cable manager sizes can be manufactured using only two molds. Moreover, five different cable manager sizes can be manufactured using only three molds.

As seen in FIG. 1, the top cable manager 10a is formed with two smaller halves, the middle cable manager 10b is formed with one smaller half and one larger half, and the bottom cable manager 10c is formed with two larger halves. For example, if the smaller half has a 1" base portion and the larger half has a 2" base portion, a cable manager 10 can be constructed having a base section 18, 20 with a width of 2", 3", or 4".

Figure 12:
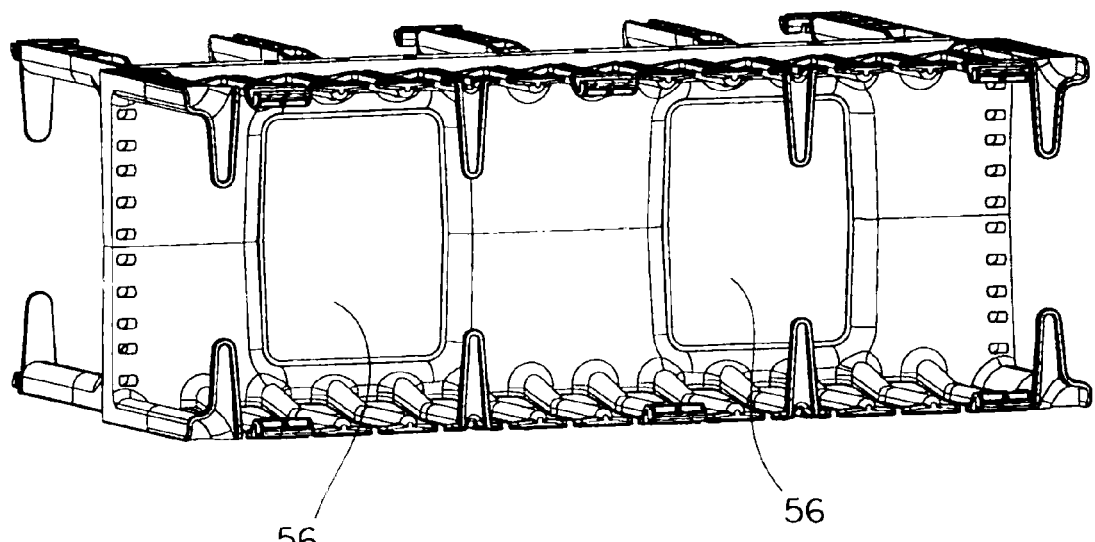
FIG. 12 is a front perspective view of a cable manager showing passthrough openings, according to an example.

FIG. 12 shows two passthrough holes 56. In addition to allowing cables to be routed between the patching side and the distribution side of the rack 5, the passthrough holes 56 may allow cool inlet air to flow into areas in which heat is generated. As a result, cooling may be accomplished without providing cooling equipment. However, cooling may only be needed in certain areas, such as the front cable routing section 12. Thus, it would be beneficial to control the inlet air flow through the rack 5.

Figure 13:
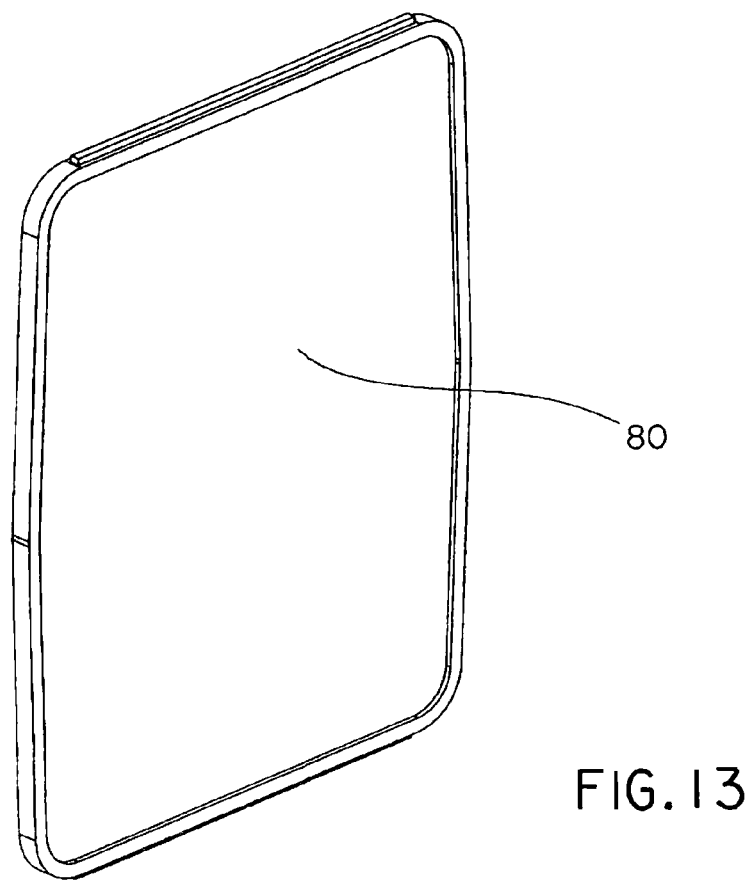
FIG. 13 is a front perspective view of an air dam for blocking the passthrough openings of FIG. 12, according to an example.

FIG. 13 shows an air blocking device or air dam 80 that may be installed into the passthrough holes 56 to control the flow of cool inlet air. The air dam 80 is designed to snap within the passthrough holes 56 as further described with reference to FIGS. 14-18. By blocking air from flowing through particular passthrough holes 56, air can be routed through non-blocked passthrough holes 56 to where the air is needed the most for cooling purposes. As a result, the thermal performance of the rack 5 may be improved.

Figure 14:
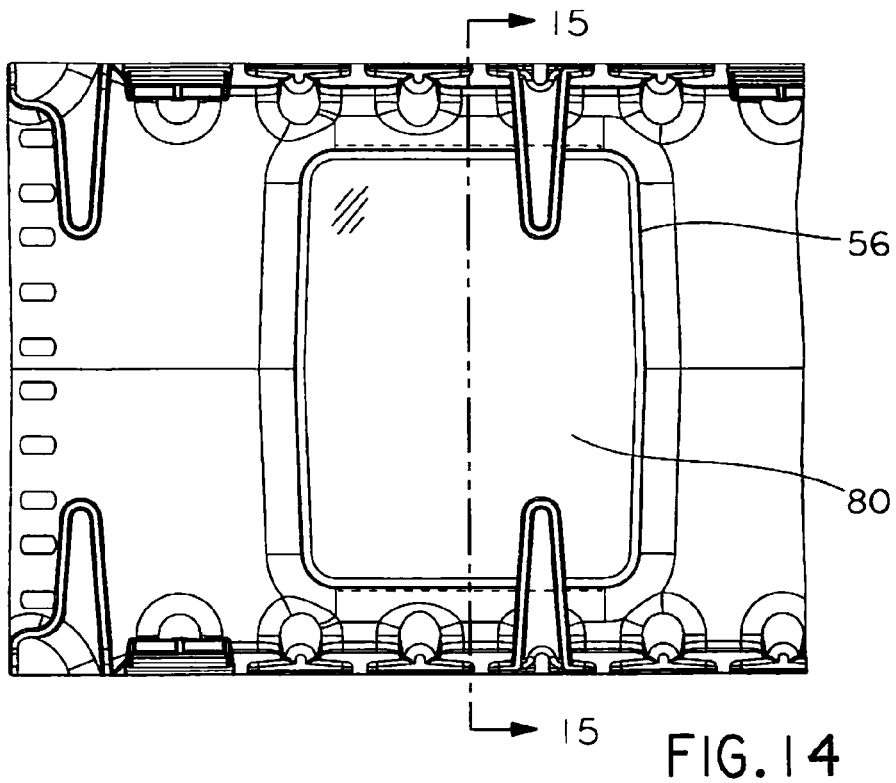
FIG. 14 is a partial view of the cable manager showing an air dam blocking a passthrough opening.
Figure 15:
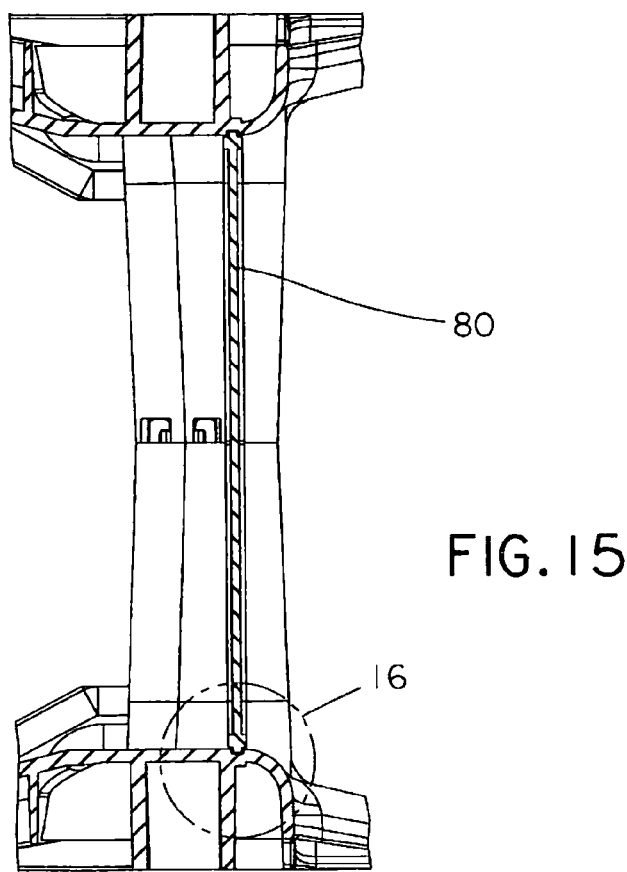
FIG. 15 is a side view of the cable manager with the air blocking device located in the passthrough opening as depicted in FIG. 14.
Figure 16:
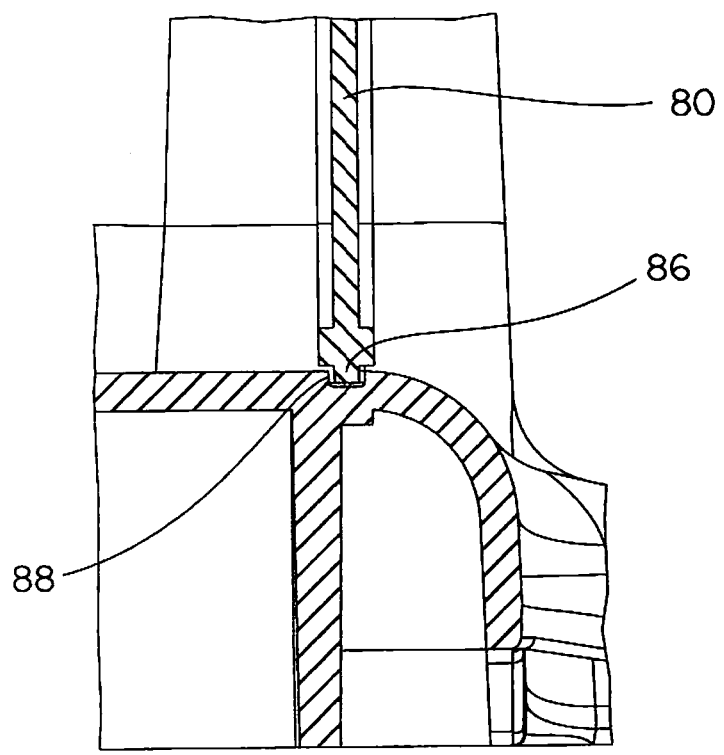
FIG. 16 is a partial view of the cable manager of FIG. 15 showing the connection of the air blocking device within the passthrough opening.

FIG. 14 shows a front view of the air dam 80 installed in the passthrough hole 56, while FIG. 15 shows a side view of the air dam 80 installed in the passthrough hole 56. FIG. 16 shows that the bottom of the air dam 80 includes a flange 86 that holds the air dam 80 in a groove 88 at the bottom of the passthrough hole 56. A similar grove 88 is located at the top of the passthrough hole 56 to secure the flange 86 at the top of the air dam 80, as seen in FIG. 17.

Figure 17:
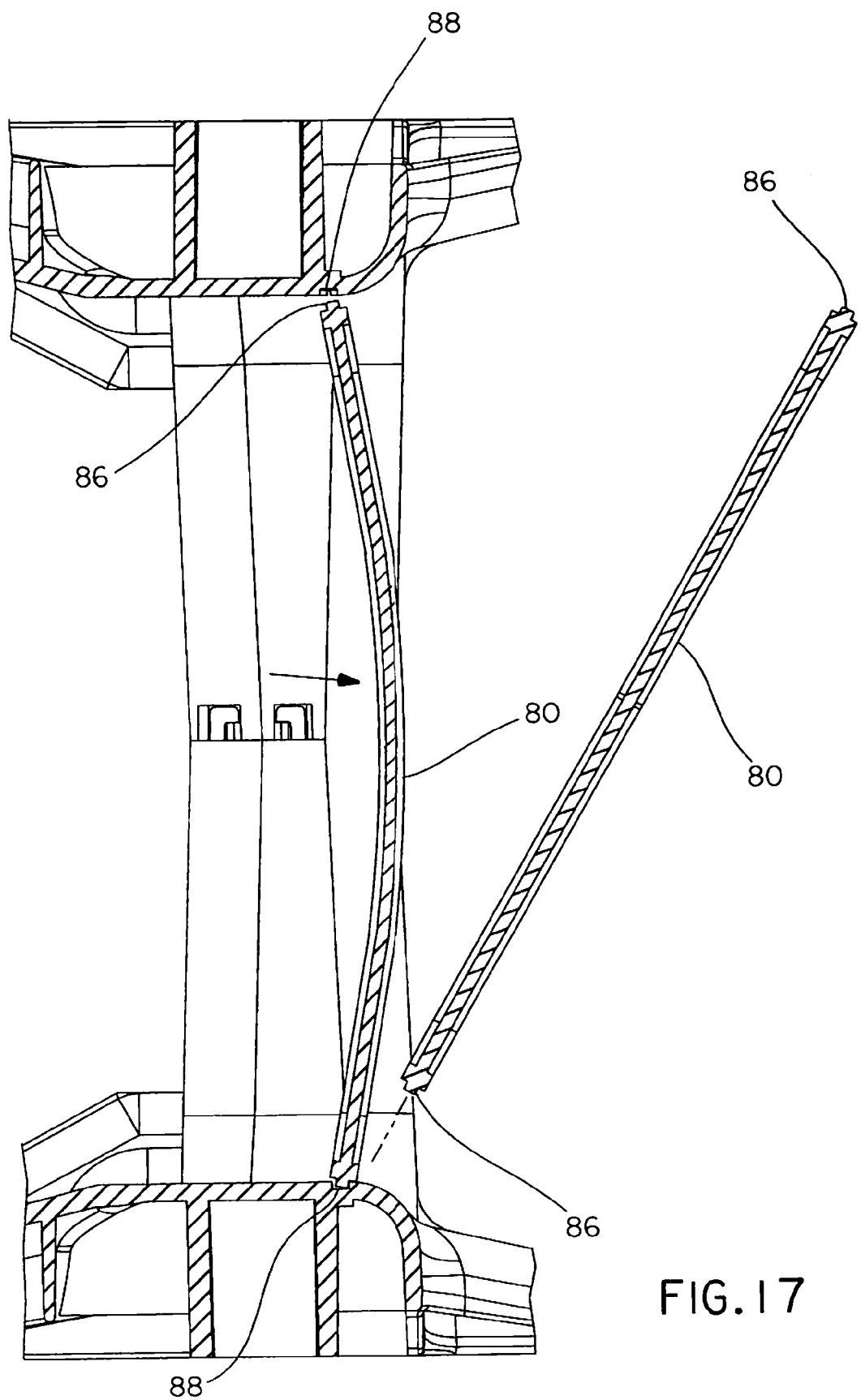
FIG. 17 is a side view showing installation of an air blocking device into the passthrough opening.

FIG. 17 shows how the air dam 80 is installed in the passthrough hole 56. As seen in FIG. 17, the air dam 80 is flexible, which causes a compression seal to be formed between the passthrough hole 56 and the air dam 80. The compression seal provides a suitable seal for blocking air flow through the passthrough hole 56.

Figure 18:
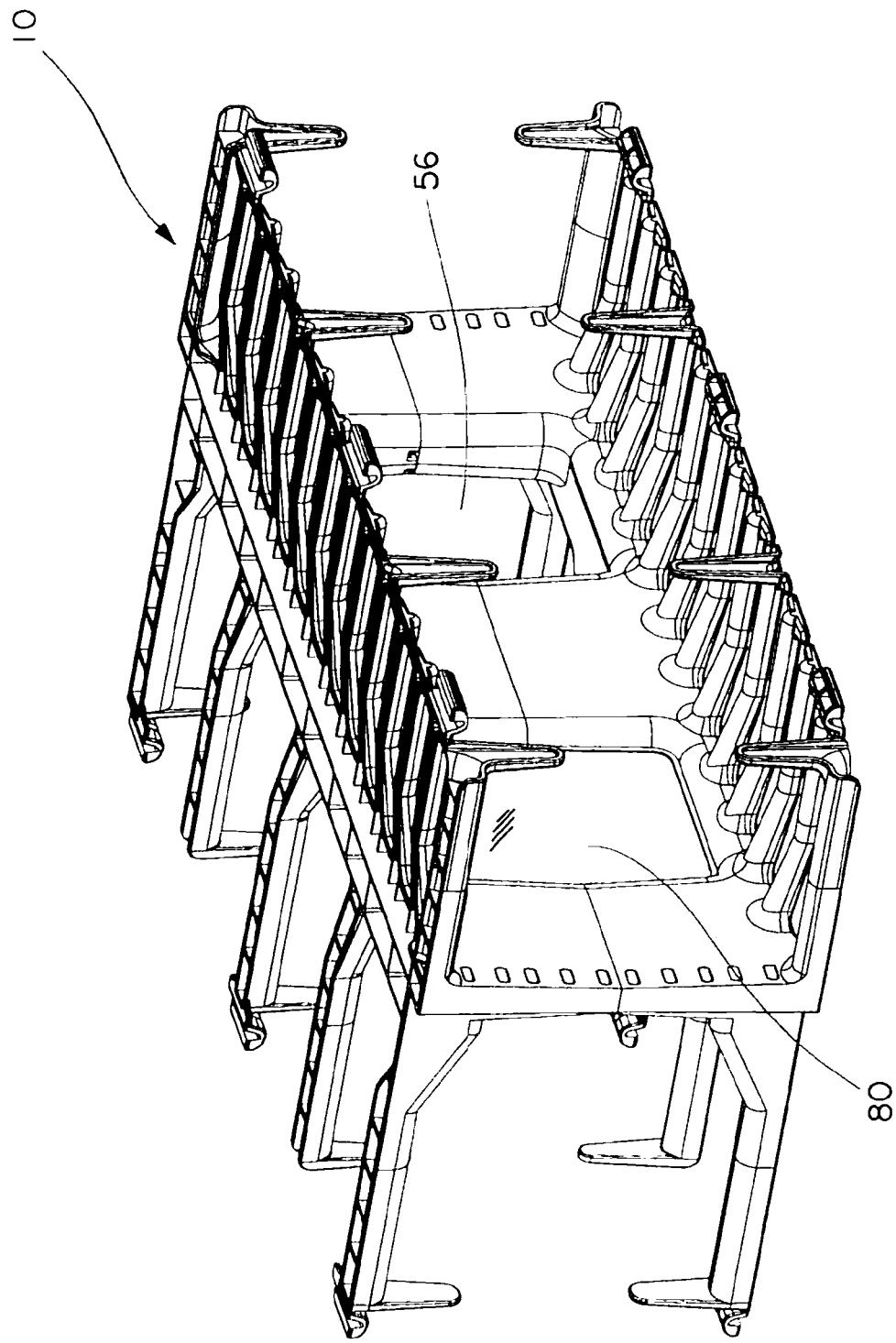
FIG. 18 is a front perspective view of a cable manager showing an air blocking device in one passthrough opening but not the other, according to an example.

FIG. 18 shows a cable manager 10 having two passthrough holes 56, one of which is blocked with an air dam 80. As previously described, air dams 80 can be selectively installed in one or more passthrough holes to control the flow of air through the rack 5. As seen in FIG. 18, air may be directed through the passthrough hole 56 on the right-hand side of the cable manager 10, but blocked from flowing through the passthrough hole 56 on the left-hand side of the cable manager 10. As a result, the air can be routed more efficiently for cooling purposes.

Figure 19:
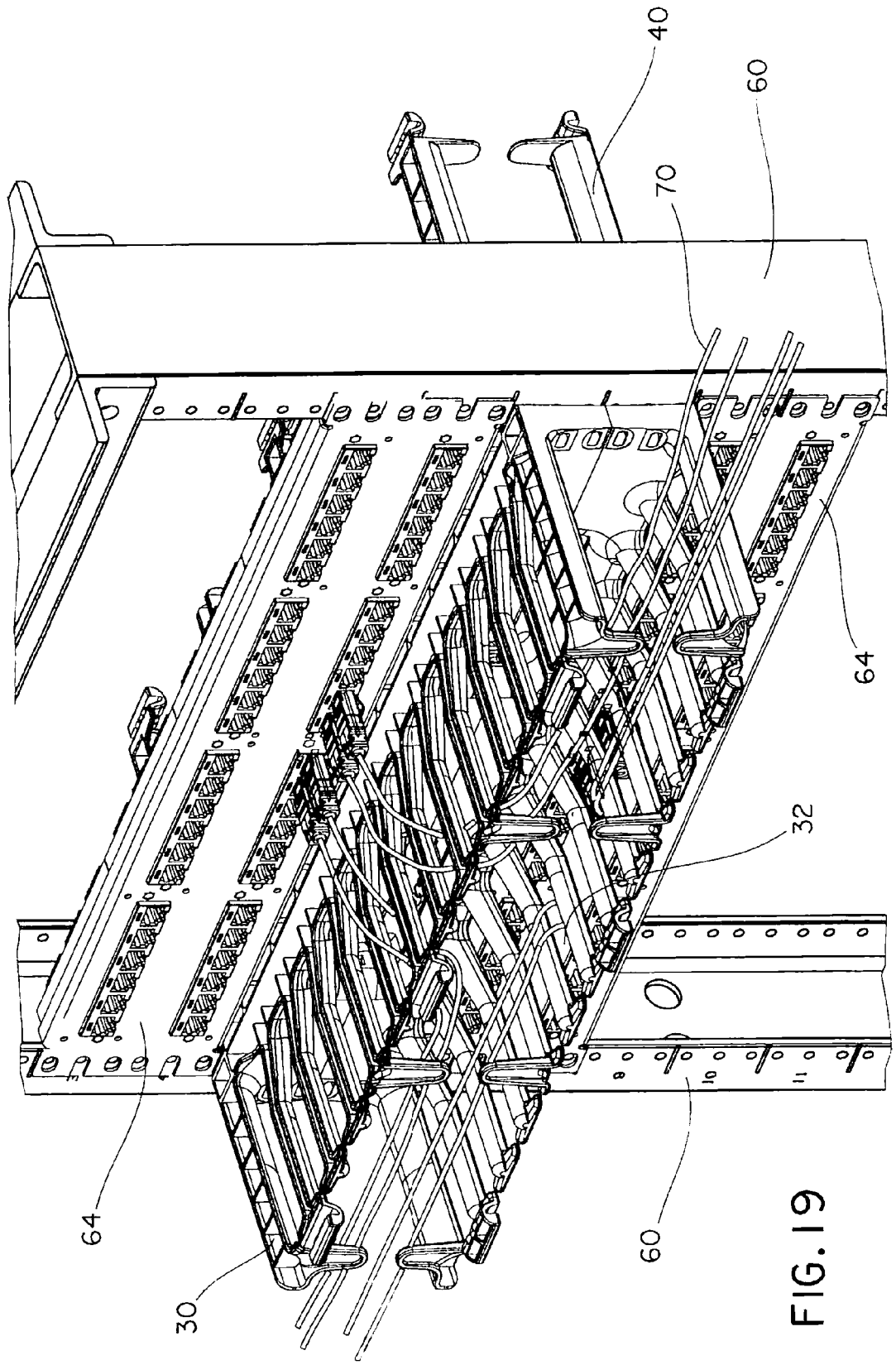
FIG. 19 is a front perspective view of a network rack having a cable manager mounted on the rack and cables connected to a patch panel, according to an example.
Figure 20:
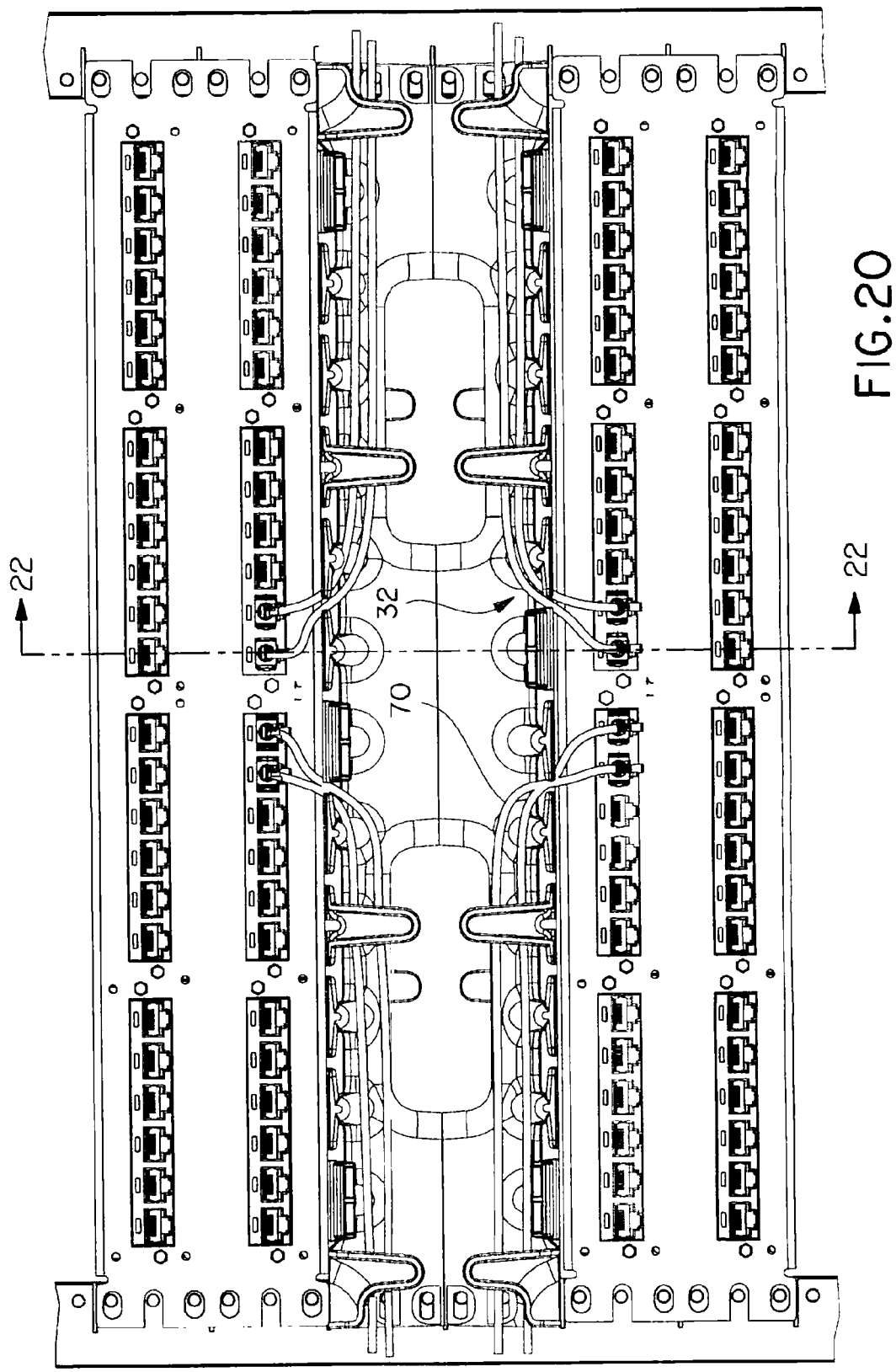
FIG. 20 is a front view of the network rack of FIG. 19 showing cables connected to a patching side of the patch panel.

FIG. 19 shows the cable manager device 10 mounted on a network rack 5 having a pair of rack legs 60, adjacent to a pair of patch panels 64. As shown, the cable manager 10 may be provided either above and/or below a patch panel 64. As can be seen, the cables 70, which are routed to connectors connected to the patch panels 64, are routed through the spaces 32 and around the fingers 30 into the front cable routing section 12 whereby they exit at either end. As shown in FIGS. 19 and 20, two cables 70 may fit in the spaces 32, which may be suitable for Cat6A cables.

Figure 21:
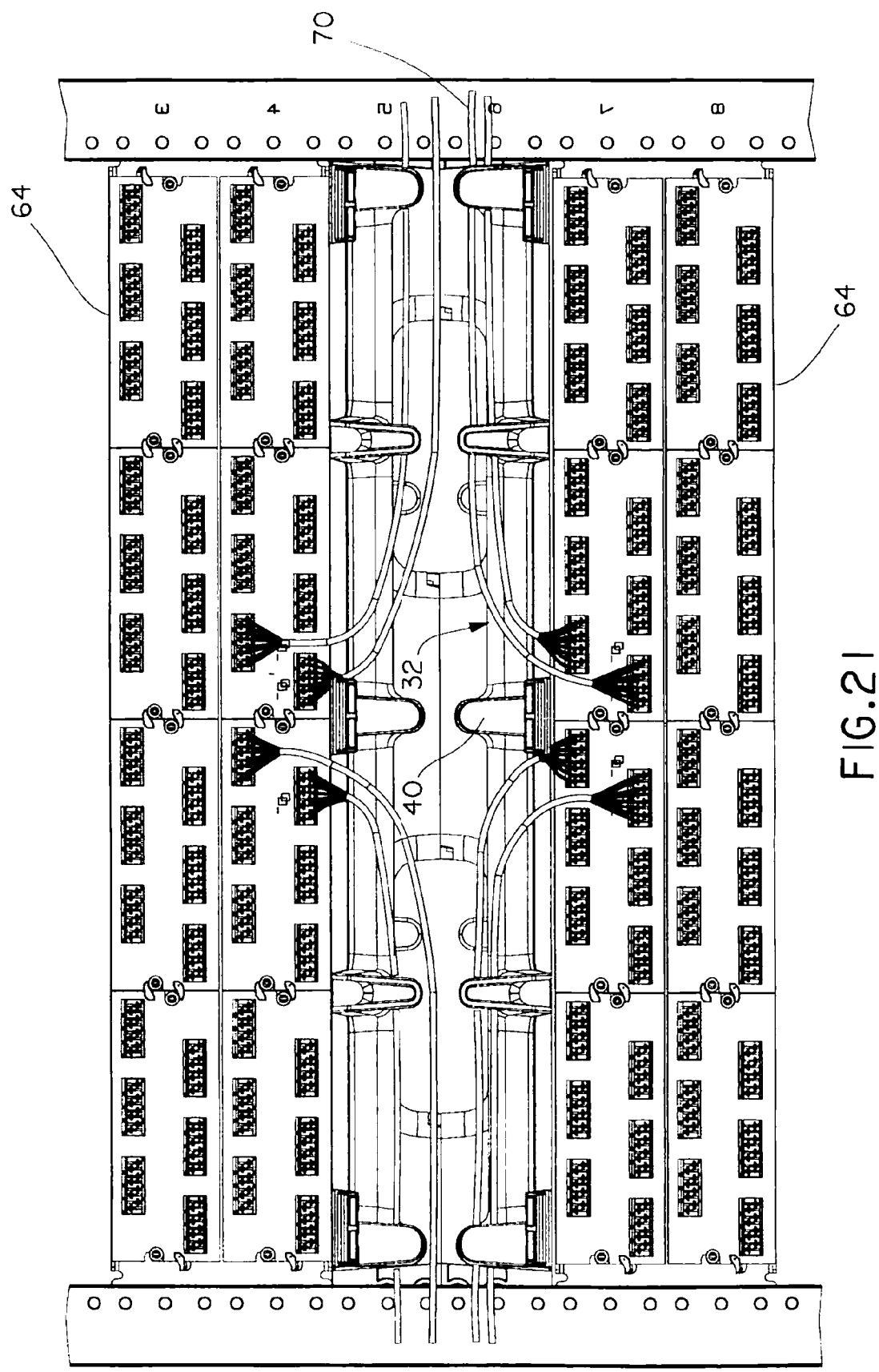
FIG. 21 is a rear view of the network rack of FIG. 19 showing cables terminating on a distribution side of the patch panel.

FIG. 21 depicts the cables 70 connected to the distribution side of the patch panel 64. Similar to the patching side, the cables 70 are routed through the spaces 32 and around the fingers 40 into the rear cable routing section 14 whereby they exit at either end.

The high-capacity horizontal cable manager described herein can manage and organize large size cables, such as Cat 6 and Cat6A cables, as well as high density installation of Cat5 and Cat5E cables. Beneficially, the use of air dams improves the thermal efficiency of the cable manager, while the improved finger design makes connecting cables easier. Additionally, the snap construction of two different sized halves make manufacturing cheaper (less molds required) and more versatile.

While the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A horizontal cable manager mountable to a network rack, the horizontal cable manager comprising:
   a central section having a longitudinal width sized to fit within the network rack, a predefined height, a front side, a rear side, and rack mounting holes provided on opposite longitudinal ends of the central section; and
   a front cable routing section extending from the front side of the central section, the front cable routing section including a first plurality of spaced fingers extending transversely from the front side of the central section,
   wherein at least one of the first plurality of spaced fingers comprises a hinge knuckle that is configured to rotatably connect to a cover.

2. The horizontal cable manager of claim 1, wherein each of the first plurality of spaced fingers has a first proximate end at the central section and a first distal end opposite the central section and wherein the first proximate end is located closer relative to a center of the front cable routing section than the first distal end.

3. The horizontal cable manager of claim 2, wherein the first distal end slopes outwardly from the first proximate end.

4. The horizontal cable manager of claim 2, wherein the front side of the central section includes a first stepped down portion adjacent the first proximate end of each of the first plurality of spaced fingers.

5. The horizontal cable manager of claim 1, wherein each of the first plurality of spaced fingers has an arcuate surface that provides bend radius control.

6. The horizontal cable manager of claim 1, wherein the first plurality of spaced fingers are arranged in multiple spaced rows.

7. The horizontal cable manager of claim 1, further comprising a rear cable routing section extending from the rear side of the central section, the rear cable routing section including a second plurality of spaced fingers extending transversely from the rear side of the central section.

8. The horizontal cable manager of claim 7, wherein each of the second plurality of spaced fingers has a second proximate end at the central section and a second distal end opposite the central section and wherein the second proximate end is located closer relative to a center of the rear cable routing section that the second distal end.

9. The horizontal cable manager of claim 8, wherein the second distal end slopes outwardly from the second proximate end.

10. The horizontal cable manager of claim 8, wherein the rear side of the central section includes a second stepped down portion adjacent the second proximate end of each of the second plurality of spaced fingers.

11. The horizontal cable manager of claim 7, wherein each of the second plurality of spaced fingers has an arcuate surface that provides bend radius control.

12. The horizontal cable manager of claim 7, wherein the second plurality of spaced fingers are arranged in multiple spaced rows.

13. The horizontal cable manager of claim 7, wherein the central section includes at least one passthrough opening that provides access between the front cable routing section and the rear cable routing section.

14. The horizontal cable manager of claim 13, further comprising an air blocking device that fits within the passthrough opening and blocks air flow from passing between the front cable routing section and the rear cable routing section when inserted.

15. The horizontal cable manager of claim 1, wherein the central section includes a first half and a second half, the first half has a first height and the second half has a second height greater than the first height, and the first height and the second height are combined to form the predefined height of the central section.

16. The horizontal cable manager of claim 1, wherein the hinge knuckle secures the cover to the at least one of the first plurality of spaced fingers and allows the cover to rotate between a closed position and an open position.

17. A horizontal cable manager mountable to a network rack, the horizontal cable manager comprising:
   a central section having a longitudinal width sized to fit within the network rack, a predefined height, a front side, a rear side, and rack mounting holes provided on opposite longitudinal ends of the central section; and
   a front cable routing section extending from the front side of the central section, the front cable routing section including a first plurality of spaced fingers extending transversely from the front side of the central section, at least one of the first plurality of spaced fingers comprising an arcuate retaining flange extending transverse from a distal end of the finger.

18. The horizontal cable manager of claim 17, wherein the first plurality of spaced fingers are arranged in multiple spaced rows, a plurality of fingers in a first spaced row comprise an arcuate retaining flange extending transverse from a distal end of each finger, and a plurality of fingers in a second spaced row comprise an arcuate retaining flange extending transverse from a distal end of each finger, wherein each of the arcuate retaining flanges of the fingers of the second spaced row are longitudinally aligned with an arcuate retaining flange of the fingers of the first spaced row.

19. A method of installing a horizontal cable manager to a network rack, comprising the steps of:
   selecting a first half of the horizontal cable manager, the first half having a longitudinal width sized to fit within the network rack, a first predefined height, rack mounting holes provided on opposite longitudinal ends of the first half, and a first plurality of spaced fingers extending transversely from a front side of the first half;
   selecting a second half of the horizontal cable manager, the second half having a longitudinal width sized to fit within the network rack, a second predefined height, rack mounting holes provided on opposite longitudinal ends of the second half, and a second plurality of spaced fingers extending transversely from a front side of the second half;
   assembling the first half and the second half; and
   securing the assembled first half and second half to the network rack using the rack mounting holes;
   wherein the second predefined height of the second half is greater than the first predefined height of the first half and the first predefined height and the second predefined combine to form a height of the horizontal cable manager.

20. The method of claim 19, wherein assembling the first half and the second half comprises connecting the first half to the second half.

* * * * *

UNITED STATES PATENT AND TRADEMARK OFFICE
CERTIFICATE OF CORRECTION

| | | |
|---|---|---|
| PATENT NO. | : 8,576,580 B2 | Page 1 of 1 |
| APPLICATION NO. | : 13/197062 | |
| DATED | : November 5, 2013 | |
| INVENTOR(S) | : Thomas C. Kelly et al. | |

It is certified that error appears in the above-identified patent and that said Letters Patent is hereby corrected as shown below:

In the Claims:

Column 9, lines 43 which reads "...section that the second distal end." should read "...section than the second distal end."

Column 10, lines 56-57 which reads "...and the second predefined combine to form..." should read "...and the second predefined height combined to form..."

Signed and Sealed this
Seventh Day of October, 2014

Michelle K. Lee
*Deputy Director of the United States Patent and Trademark Office*